US011697301B2

(12) United States Patent
Moshiri et al.

(10) Patent No.: US 11,697,301 B2
(45) Date of Patent: Jul. 11, 2023

(54) REMOTELY PROGRAMMABLE WEARABLE DEVICE

(71) Applicant: Baysoft LLC, Woodbury, MN (US)

(72) Inventors: Sahar Moshiri, Los Angeles, CA (US); Mehdi Shokoueinejad, New Brighton, MN (US); Kambiz Farbakhsh, Lake Elmo, MN (US)

(73) Assignee: Baysoft LLC, Woodbury, MN (US)

( * ) Notice: Subject to any disclaimer, the term of this patent is extended or adjusted under 35 U.S.C. 154(b) by 0 days.

(21) Appl. No.: 17/518,097

(22) Filed: Nov. 3, 2021

(65) Prior Publication Data
US 2022/0144002 A1    May 12, 2022

Related U.S. Application Data

(60) Provisional application No. 63/136,414, filed on Jan. 12, 2021, provisional application No. 63/111,690, filed on Nov. 10, 2020.

(51) Int. Cl.
| | |
|---|---|
| *B42D 25/305* | (2014.01) |
| *G06F 21/62* | (2013.01) |
| *B42D 25/23* | (2014.01) |
| *B42D 25/309* | (2014.01) |

(52) U.S. Cl.
CPC ......... *B42D 25/305* (2014.10); *B42D 25/23* (2014.10); *B42D 25/309* (2014.10); *G06F 21/6245* (2013.01)

(58) Field of Classification Search
CPC .... B42D 25/305; B42D 25/23; B42D 25/309; G06F 21/6245; G16H 10/65; G16H 10/60; G06K 19/04; G06K 19/067; G06K 19/10
See application file for complete search history.

(56) References Cited

U.S. PATENT DOCUMENTS

| | | | | |
|---|---|---|---|---|
| 6,504,928 B1 * | 1/2003 | Toyooka | ........... | B29C 45/14221 |
| | | | | 379/433.01 |
| 8,661,889 B2 * | 3/2014 | Blake | ..................... | G07D 5/005 |
| | | | | 73/163 |
| 9,129,230 B2 * | 9/2015 | Lewis | ..................... | G06Q 10/00 |
| 9,361,657 B2 * | 6/2016 | Hunt | ................ | G06K 19/06037 |
| 9,721,405 B1 * | 8/2017 | Shinto | ...................... | G07C 9/21 |
| 9,933,878 B2 * | 4/2018 | Reilly | ..................... | G06F 21/84 |
| 10,057,748 B1 * | 8/2018 | Wolf | .................. | G06Q 20/3274 |

(Continued)

*Primary Examiner* — Daniel I Walsh
(74) *Attorney, Agent, or Firm* — Fredrikson & Byron, P.A.

(57) ABSTRACT

A wearable device includes a wireless receiver, a processor, a memory component, and a graphical display. The wireless receiver is configured to be in wireless signal communication with a remote user device so that the wireless receiver can receive a programming signal from the remote user device. The memory component stores non-transitory computer-executable instructions that, when executed by the processor, cause the wearable device to display one or more graphics at the graphical display. Upon receiving the programming signal from the remote user device, the processor can execute the non-transitory computer-executable instructions to cause the processor to generate an interface input signal based on the received programming signal and convey the interface input signal to the graphical display to cause the graphical display to display one or more graphics corresponding to the interface input, and thus corresponding to the programming signal.

15 Claims, 5 Drawing Sheets

(56) References Cited

U.S. PATENT DOCUMENTS

| | | | |
|---|---|---|---|
| 10,108,909 B2* | 10/2018 | Sulavik | H04W 12/06 |
| 10,230,705 B1* | 3/2019 | Joshi | H04L 63/123 |
| 10,304,268 B1* | 5/2019 | Ghenn | G07C 9/29 |
| 10,313,881 B2* | 6/2019 | Liu | G06F 21/31 |
| 10,496,909 B1* | 12/2019 | Holman | G07D 7/0043 |
| 10,916,955 B1* | 2/2021 | Scatino | H02J 7/0045 |
| 11,257,057 B1* | 2/2022 | Asmi | G07G 1/01 |
| 11,308,747 B1* | 4/2022 | Sahani | G07C 9/27 |
| 11,455,362 B2* | 9/2022 | Singh | G06F 16/9554 |
| 2002/0060246 A1* | 5/2002 | Gobburu | G06Q 30/02 235/462.46 |
| 2004/0117889 A1* | 6/2004 | Shultz | G09F 3/00 2/69 |
| 2005/0240484 A1* | 10/2005 | Yan | G07B 15/00 455/411 |
| 2006/0015404 A1* | 1/2006 | Tran | G06Q 30/00 705/14.25 |
| 2006/0054695 A1* | 3/2006 | Owada | G06Q 30/06 235/440 |
| 2007/0028344 A1* | 2/2007 | Czajka | A41D 13/1209 2/51 |
| 2008/0279959 A1* | 11/2008 | Holmes | A45C 11/182 206/39 |
| 2008/0313939 A1* | 12/2008 | Ardill | G09F 3/02 40/329 |
| 2009/0174633 A1* | 7/2009 | Kumhyr | G09F 9/33 345/82 |
| 2010/0250271 A1* | 9/2010 | Pearce | G06Q 10/06 705/2 |
| 2011/0300806 A1* | 12/2011 | Lindahl | G10L 21/0208 455/63.1 |
| 2012/0074217 A1* | 3/2012 | Block | G06Q 20/327 235/379 |
| 2012/0115430 A1* | 5/2012 | Hawkes | H04W 4/90 455/404.1 |
| 2012/0142379 A1* | 6/2012 | Park | H04M 1/72463 455/457 |
| 2012/0221474 A1* | 8/2012 | Eicher | G09C 5/00 705/26.1 |
| 2012/0242589 A1* | 9/2012 | Schmidt | G06F 3/017 345/173 |
| 2012/0330695 A1* | 12/2012 | Gallo | G06Q 20/0457 705/5 |
| 2013/0005404 A1* | 1/2013 | Bremer | G06K 7/1417 235/487 |
| 2013/0146658 A1* | 6/2013 | Guerra | G06Q 20/351 235/380 |
| 2013/0218931 A1* | 8/2013 | Lewis | G06Q 10/00 707/803 |
| 2013/0323476 A1* | 12/2013 | Farrell | B29C 66/41 428/195.1 |
| 2013/0341394 A1* | 12/2013 | Seo | G07C 9/253 235/492 |
| 2014/0018059 A1* | 1/2014 | Noonan | H04W 52/283 455/419 |
| 2014/0104656 A1* | 4/2014 | Crisp | G06Q 30/0276 358/1.18 |
| 2014/0180850 A1* | 6/2014 | Ackley | G06Q 20/3274 705/16 |
| 2014/0266590 A1* | 9/2014 | Guillaud | G07C 9/29 340/8.1 |
| 2015/0012305 A1* | 1/2015 | Truskovsky | G06Q 10/02 705/5 |
| 2015/0170307 A1* | 6/2015 | Hunt | G06K 7/10891 235/380 |
| 2015/0213353 A1* | 7/2015 | Cuervo | G06F 3/044 235/492 |
| 2015/0248663 A1* | 9/2015 | Meere | G06Q 20/10 705/17 |
| 2015/0302159 A1* | 10/2015 | Casse | H04L 67/12 705/2 |
| 2015/0379549 A1* | 12/2015 | Hwang | G09C 1/00 705/14.27 |
| 2016/0044203 A1* | 2/2016 | Paul | H04N 1/04 705/5 |
| 2016/0212252 A1* | 7/2016 | Parker | H04M 1/17 |
| 2017/0083878 A1* | 3/2017 | Conrad | G06Q 20/085 |
| 2017/0178207 A1* | 6/2017 | Steinberg | G06Q 30/0282 |
| 2017/0337045 A1* | 11/2017 | Hills | G06F 8/38 |
| 2018/0075229 A1* | 3/2018 | Jan | G06F 21/35 |
| 2018/0166160 A1* | 6/2018 | Walton, III | G16H 10/65 |
| 2018/0260672 A1* | 9/2018 | Huff | G07C 9/25 |
| 2018/0311499 A1* | 11/2018 | Yun | A61K 31/00 |
| 2019/0023057 A1* | 1/2019 | Davies-Smith | B43K 7/12 |
| 2019/0065998 A1* | 2/2019 | Xu | G06Q 40/04 |
| 2019/0294775 A1* | 9/2019 | Okabe | G06F 21/35 |
| 2020/0257408 A1* | 8/2020 | Yoshida | G06F 3/0486 |
| 2020/0302951 A1* | 9/2020 | Deng | G08B 21/0208 |
| 2021/0067620 A1* | 3/2021 | Anderson | G06F 1/1656 |
| 2021/0125444 A1* | 4/2021 | Terry | G07C 9/28 |
| 2021/0144140 A1* | 5/2021 | Murphy | G06F 21/33 |
| 2021/0169605 A1* | 6/2021 | Calloway | A61B 90/36 |
| 2021/0195398 A1* | 6/2021 | Baldree | G08B 21/0297 |
| 2021/0213156 A1* | 7/2021 | Tuteja | A61L 27/26 |
| 2021/0258168 A1* | 8/2021 | Decoux | H04L 9/3247 |
| 2021/0312464 A1* | 10/2021 | Peng | G10L 17/22 |
| 2021/0313069 A1* | 10/2021 | Williams | G16H 50/30 |
| 2021/0331937 A1* | 10/2021 | DuBois | C01G 45/1264 |
| 2022/0108792 A1* | 4/2022 | Althumairi | G16H 10/20 |
| 2022/0189227 A1* | 6/2022 | Purohit | G06Q 50/30 |
| 2022/0189285 A1* | 6/2022 | Kutscher | H04B 1/3888 |
| 2022/0218256 A1* | 7/2022 | Thiagarajan | A61B 5/14532 |
| 2022/0261813 A1* | 8/2022 | Mimassi | G06Q 20/3227 |
| 2022/0284254 A1* | 9/2022 | Sprague | G06K 19/07762 |
| 2022/0398886 A1* | 12/2022 | Birnbaum | H04W 4/80 |
| 2022/0411441 A1* | 12/2022 | Grant | A01N 43/90 |

\* cited by examiner

REMOTELY PROGRAMMABLE WEARABLE DEVICE

RELATED APPLICATIONS

This application claims priority to U.S. provisional patent application No. 63/111,690, filed on Nov. 10, 2020, and U.S. provisional patent application No. 63/136,414, filed on Jan. 12, 2021.

TECHNICAL FIELD

This disclosure generally relates to remotely programmable wearable devices as well as related systems and methods. Embodiments are described herein in the context of wearable devices configured to receive programming input from a remote device as well as systems and methods that facilitate programming wearable devices.

BACKGROUND

Wearable devices can be useful for a variety of purposes. As one example, wearable devices can convey a message to those who see the wearable device on a user. For instance, a name tag conveys the name of a wearer to those who see the name tag. This can be particularly helpful in instances where one or more barriers to traditional communication exist, such as where a wearer is unable to communicate or speaks a different language than an observer.

However, such wearable devices tend to be static in the message conveyed thereat. As such, for a wearer to change the message conveyed by a wearable device, the wearer typically needs to discard the wearable device and put on a new wearable device with the altered message.

SUMMARY

In general, various embodiments relating to remotely programmable wearable devices as well as related systems and methods are disclosed herein. In particular, embodiments are disclosed herein in the context of wearable devices configured to receive programming input from a remote device as well as systems and methods that facilitate programming wearable devices, such as via a remote device. Embodiments disclosed herein can be useful, for example, in providing an improved, dynamic ability to alter one or more graphics displayed at a wearable device. In particular, wearable device embodiments disclosed herein can be remotely programmed to display one or more desired graphics, thus allowing a graphic displayed at the wearable device to be altered on-demand. Accordingly, when a user decides he or she would like a wearable device to display a different graphic, the user can selectively change the graphic displayed at the wearable device without needing to discard the wearable device. This can also be useful, for example, in providing for increased flexibility in prolonged use of the wearable device by allowing one or more graphics displayed at the wearable device to change as appropriate for the circumstances at hand.

In addition, some embodiments disclosed herein can include a wearable device that is configured to generate an output graphic based on certain types of input received at the wearable device. As one example, such a wearable device can be configured to receive a voice input, at the wearable device, in a first language and output, at the wearable device, a translation graphic in a second, different language in response to receiving the voice input in the first language. The translation graphic displayed at the wearable device can be the same content as the voice message but in the second language. As another example, such a wearable device can be configured to be worn by a patient and can be configured to receive, at the wearable device, a request for medical biographical information (e.g., a request for patient symptoms, a request for patient known allergies, such as any past allergic reactions to any pharmaceutical, a request for health insurance information, such as health insurance policy number, and/or a request for patient chronic conditions) and output, at the wearable device, a responsive medical biographical graphic in response to receiving the request for medical biographical information. In the example where the request for medical biographical information is a request for patient symptoms, the responsive medical biographical graphic displayed at the wearable device can be an indication of one or more symptoms experienced by the patient wearing the wearable device (e.g., by accessing a memory component, such as a non-transitory computer-readable storage article, for instance at the wearable device or in the cloud, previously programmed with one or more symptoms experienced by the patient). In the example where the request for medical biographical information is a request for patient known allergies, the responsive medical biographical graphic displayed at the wearable device can be an indication of one or more allergies the patient is known to have experienced (e.g., a past allergic reaction to a specific pharmaceutical compound) (e.g., by accessing a memory component, such as a non-transitory computer-readable storage article, for instance at the wearable device or in the cloud, previously programmed with one or more allergies the patient is known to have experienced). In the example where the request for medical biographical information is a request for health insurance information, the responsive medical biographical graphic displayed at the wearable device can be an indication of a health insurance policy (e.g., a health insurance policy number, an image of the patient's health insurance card) possessed by the patient wearing the wearable device (e.g., by accessing a memory component, such as a non-transitory computer-readable storage article, for instance at the wearable device or in the cloud, previously programmed with information identifying the patient's health insurance policy). In the example where the request for medical biographical information is a request for patient chronic conditions, the responsive medical biographical graphic displayed at the wearable device can be an indication of any chronic condition(s) (e.g., hypertension, diabetes, obesity, heart disease, asthma, arthritis, etc.) of the patient wearing the wearable device (e.g., by accessing a memory component, such as a non-transitory computer-readable storage article, for instance at the wearable device or in the cloud, previously programmed with information identifying the patient's chronic condition(s)).

One embodiment includes a wearable device. This wearable device includes a wireless receiver, a processor (e.g., programmable processor), a memory component (e.g., a non-transitory computer-readable storage article), and a graphical display. The wireless receiver is configured to be in wireless signal communication with a remote user device so that the wireless receiver can receive a programming signal from the remote user device. The memory component stores non-transitory computer-executable instructions that, when executed by the processor, cause the wearable device to display one or more graphics at the graphical display. After receiving the programming signal from the remote user device, the processor can execute the non-transitory computer-executable instructions to cause the processor to generate an interface input signal based on the received programming signal and convey the interface input signal to the graphical display at the wearable device to cause the graphical display at the wearable device to display thereat one or more graphics corresponding to the interface input signal, and thus corresponding to the received programming signal.

In a further embodiment of the above wearable device, the wearable device also includes an attachment mechanism. The attachment mechanism is configured to removably attach the wearable device to a user so that the wearable device can be worn by the user.

In a further embodiment of the above wearable device, the wearable device also includes an input mechanism. The input mechanism can be configured to receive one or more types of input at the wearable device. As one example, the input mechanism can be a microphone that is configured to receive audio input in the vicinity of the wearable device. As another example, the input mechanism can be one or more buttons that are configured to receive one or more touch inputs at the wearable device, with the one or more buttons configured to cause an interface input signal (e.g., corresponding to a predetermined input request displayed at the graphical display of the wearable device) to be generated at the wearable device in response to actuation of the one or more buttons.

In a further embodiment of the above wearable device, the wearable device also includes a speaker. The speaker can be configured to output audio at the wearable device, for instance, in response to input (e.g., the programming signal, audio input, button actuation) received at the wearable device.

An additional embodiment includes a wearable device. This wearable device embodiment includes a processor, a wireless receiver connected to the processor, a graphical display connected to the processor, and a memory component connected to the processor. The wireless receiver is configured to receive a programming signal from a remote user device, and the programming signal includes a specified graphic. The memory component stores non-transitory computer-executable instructions that, when executed by the processor, cause the processor to display, at the graphical display, the specified graphic.

In a further embodiment of this wearable device, the graphical display includes a first display region configured to display a first text-based message and a second, different text-based message, and the graphical display includes a second display region configured to display a photo of a wearer of the wearable device. The specified graphic can include a first specified text-based message to be displayed as the first text-based message at the first display region, a second specified text-based message to be displayed as the second, different text-based message at the first display region, and a first specified photo to be displayed as the photo of the wearer at the second display region. For instance, the first text-based message and the second, different text-based message can be selected from the group consisting of: a name of the wearer, a job title of the wearer, an identification number assigned to the wearer, contact information for the wearer, a signature of the wearer, and a date of birth of the wearer. The graphical display can further include a third display region configured to display a quick-response code, and the quick-response code can be a unique code corresponding to the wearer. For instance, the quick-response code can be configured to cause a device imaging the quick-response code to access information, stored remotely from the wearable device, pertaining to the wearer.

In some such cases, the quick-response code can be configured to cause the device imaging the quick-response code to access medical biographical information pertaining to the wearer and stored remotely from the wearable device, and the medical bibliographical information pertaining to the wearer can be selected from the group consisting of: wearer medical symptoms, wearer allergies, wearer health insurance information, and wearer chronic condition(s). The graphical display can further include a subjective text display field that is configured to display a message corresponding to the specified graphic, and the message corresponding to the specified graphic and displayed at the subjective text display field can include an indication of at least one of an emotional mood of the wearer, a cognitive state of the wearer, and a preferred language of the wearer.

In a further embodiment of this wearable device, the non-transitory computer-executable instructions stored at the memory component can be configured, when executed by the processor, to cause the processor to: (i) translate a message, received via the specified graphic, from a first language in which the specified graphic is received to a second, different language, and (ii) display, via the first display region, the message in the second, different language. In some such embodiments, the memory component can store a correspondence table that correlates alphabetic characters of the first language to alphabetic characters of the second, different language.

In a further embodiment of this wearable device, the wearable device can further include a privacy button connected to the processor, and the privacy button can be configured to selectively enable/disable display of predetermined information at the graphical display. For example, the predetermined information can include medical biographical information.

In a further embodiment of this wearable device, the wearable device can further include a microphone connected to the processor, and the microphone can be configured to detect ambient audio in the vicinity of the wearable device. The non-transitory computer-executable instructions stored at the memory component can include a voice recognition application that is configured, when executed by the processor, to cause the processor to compare the ambient audio in the vicinity of the wearable device to a plurality of audio records stored in the memory component to determine whether the ambient audio in the vicinity of the wearable device matches any one of the plurality of audio records stored in the memory component to a predetermined degree. For example, when the processor determines that the ambient audio in the vicinity of the wearable device matches one of the plurality of audio records stored in the memory component to a predetermined degree, the processor can be configured to cause the graphical display to display an indication of a source of the ambient audio in the vicinity of the wearable device.

In a further embodiment of this wearable device, the wearable device can further include a location tracking mechanism connected to the processor, and the location tracking mechanism can be configured to identify a current location of the wearable device. For example, such wearable device can further include a privacy button connected to the processor, and the privacy button can be configured to selectively enable/disable display of predetermined information at the graphical display. The processor can use the current location of the wearable device as input from the location tracking mechanism to output a command to the privacy button to selectively enable/disable display of the predetermined information based on the current location of the wearable device. In some such embodiments, the wearable device can also include an access credential component connected to the processor. The access credential component can be configured to convey an access credential to an access restriction device to selectively enable access to an area to which access is restricted by the access restriction device. In some such cases, the process can use the current location of the wearable device as input from the location tracking mechanism to output a command to the access credential component to output the access credential based on the current location of the wearable device.

Another embodiment includes a system. This system embodiment includes a wearable device, a remote user device, and a remote server. The wearable device can include a processor, a wireless receiver connected to the processor, a graphical display connected to the processor, and a memory component connected to the processor. The memory component can store non-transitory computer-executable instructions that, when executed by the processor, cause the processor to display, at the graphical display, a specified graphic. The remote user device can be in wireless communication with the wearable device, and the wireless receiver of the wearable device can be configured to receive a programming signal from the remote user device, and the programming signal can include the specified graphic. The remote server can be in wireless communication with the wearable device and the remote user device.

An additional embodiment includes a method. This method embodiment includes the steps of receiving, at a wearable device, a programming signal from a remote user device, where the programming signal includes a specified graphic for display at the wearable device, and, as a result of receiving the programming signal, generating, at the wearable device, an interface input signal based on the received programming signal, where the interface input signal provides the specified graphic from a memory component of the wearable device to a graphical display of the wearable device. This method embodiment also includes the steps of displaying the specified graphic at the graphical display of the wearable device, and, after displaying the specified graphic at the graphical display of the wearable device, receiving, at the wearable device, a second programming signal from the remote user device, where the second programming signal includes a second specified graphic for display at the wearable device. And, this method embodiment additionally includes the steps of, as a result of receiving the second programming signal, generating, at the wearable device, a second interface input signal based on the received second programming signal, where the second interface input signal provides the second specified graphic from the memory component of the wearable device to the graphical display of the wearable device, and displaying the second specified graphic at the graphical display of the wearable device.

Another embodiment includes a method. The method includes the step of receiving, at a wearable device, a programming signal from a remote user device. The method also includes the step of generating, at the wearable device, an interface input signal based on the received programming signal. And, the method includes the step of displaying one or more graphics at a graphical display of the wearable device corresponding to the interface input signal and the programming signal.

In a further embodiment of the above method, the method further includes the step of receiving, at the wearable device, a second programming signal from the remote user device. The method also includes the step of generating, at the wearable device, a second interface input signal based on the received second programming signal. And, the method includes the step of altering the graphical display of the wearable device to display at least one second graphic at the graphical display. The at least one second graphic is different from the one or more graphics displayed at the graphical display corresponding to the first interface input signal and the first programming signal, and the at least one second graphic displayed at the graphical display of the wearable device corresponds to the second interface input signal and the second programming signal.

An addition embodiment includes a system. The system includes a wearable device and a remote user device. The wearable device includes a wireless receiver (e.g., as part of a wearable device wireless transceiver also including a wireless transmitter), a first processor (e.g., programmable processor), a first memory component, and a graphical display. The remote user device includes a wireless transmitter (e.g., as part of a remote device wireless transceiver also including a wireless receiver), a second processor, a second memory component, and a user interface. The wireless receiver of the wearable device is configured to be in wireless signal communication with the wireless transmitter of the remote user device so that the wireless receiver can receive a programming signal from the remote user device. The second memory component stores non-transitory computer-executable instructions that, when executed by the second processor, cause the remote user device to transmit a programming signal, to the wearable device, corresponding to programming input received at the user interface. The first memory component stores non-transitory computer-executable instructions that, when executed by the first processor, cause the wearable device to display one or more graphics at the graphical display. Upon receiving the programming signal from the remote user device, the first processor can execute the non-transitory computer-executable instructions to cause the first processor to generate an interface input signal based on the received programming signal and convey the interface input signal to the graphical display to cause the graphical display to display one or more graphics corresponding to the interface input, and thus corresponding to the programming signal and ultimately the programming input received at the user interface of the remote user device.

In a further embodiment of the above system, the wearable device and the remote user device can be two-way communication such that the wearable device can receive data (e.g., via the programming signal) from the remote user device and the remote user device can receive data from the wearable device. Thus, in such embodiment, not only can the wireless receiver of the wearable device be configured to be in wireless signal communication with the wireless transmitter of the remote user device, but also the wireless receiver of the remote user device can be configured to be in wireless signal communication with the wireless transmitter of the wearable device.

In a further embodiment of above system, the system can also include a remote server ("cloud"). The remote server can be configured to store various types of information, including any of the various types of information disclosed herein as well as, for instance, contact information, account information, biographical information corresponding to the user of the wearable device, and to facilitate the wireless signal communication between the wearable device and the remote user device.

The details of one or more examples are set forth in the accompanying drawings and the description below. Other features, objects, and advantages will be apparent from the description and drawings.

BRIEF DESCRIPTION OF THE DRAWINGS

The following drawings are illustrative of particular embodiments of the present invention and, therefore, do not limit the scope of the invention. The drawings are intended for use in conjunction with the explanations in the following description. Embodiments of the invention will hereinafter be described in conjunction with the appended drawings, wherein like numerals denote like elements. The features illustrated in the drawings are not necessarily to scale, though embodiments within the scope of the present invention can include one or more of the illustrated features (e.g., each of the illustrated features) at the scale shown.

DETAILED DESCRIPTION

The following detailed description is exemplary in nature and is not intended to limit the scope, applicability, or configuration of the invention in any way. Rather, the following description provides some practical illustrations for implementing embodiments of the present invention. Examples of constructions, materials, and/or dimensions are provided for selected elements. Those skilled in the art will recognize that many of the noted examples have a variety of suitable alternatives.

Figure 1:
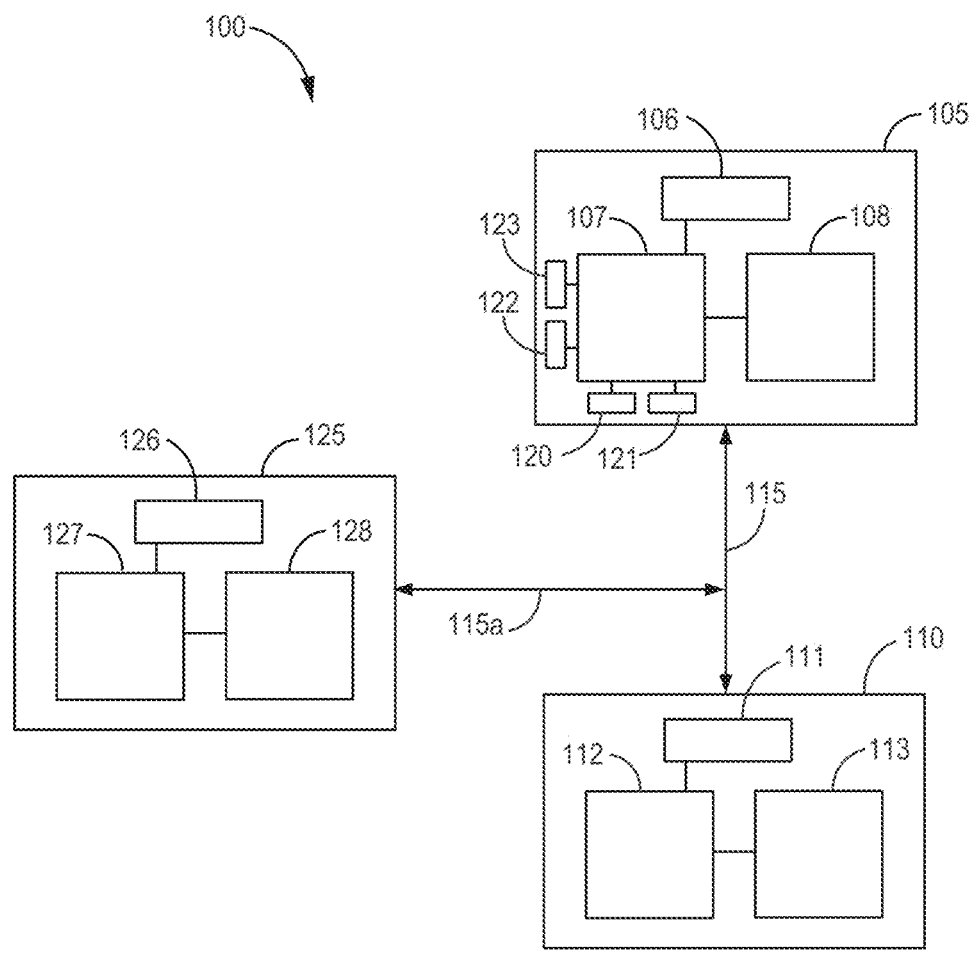
FIG. 1 is a block diagram of an embodiment of a system that includes a wearable device and a remote user device.

FIG. 1 shows an exemplary embodiment of a system 100. The system 100 includes a wearable device 105 and a remote user device 110. The wearable device 105 and the remote user device 110 can be in signal communication, for instance, via a wireless connection, such that data can be sent from the remote user device 110 to the wearable device 105. In addition, in some embodiments, the wearable device 105 and the remote user device 110 can be in two-way signal communication such that the wearable device 105 can also be configured to send data to the remote user device 100. Thus, the wearable device 105 and the remote user device 110 can be configured to be in data communication (e.g., two-way data communication) allowing for real-time, or near real-time, display of data at the wearable device 105 received from the remote user device 110 and display of data at the remote user device 110 received from the wearable device 105.

In some embodiments, such as the illustrated example, the system 100 can also include a remote server 125 ("cloud"). The remote server 125 can include a wireless transceiver 126, a third processor (e.g., a programmable processor) and a third memory component 127, and a user interface 128. When included in the system 100, the remote server 125 can be in communication with each of the wearable device 105 and the remote user device 110 via the wireless transceiver 126 over a wireless connection 115, 115a (e.g., the Internet, cellular connection, etc.). When the system 100 does not include remote server 125, the wireless connection 115a can be eliminated and the wireless connection 115 between the wearable device 105 and the remote user device 110 can be used to facilitate data communication between the wearable device 105 and the remote user device 110. The third processor and the third memory component 127 can be configured to store non-transitory computer-executable instructions that, when executed by the third processor 127, cause the remote server 125 to take one or more actions specified by the non-transitory computer-executable instructions, such as transmitting requested data (e.g., data to/from the wearable device 105 and from/to the remote user device 110 or data from the third memory component 127 to the wearable device 105 and/or to the remote user device 110) between the wearable device 105 and the remote user device 110. In one embodiment, the remote server 125 can store, at the third memory component 127, user account information (e.g., user account name, user account password, user bibliographic information (e.g., name, race, height, weight), and/or data saved by the user to the user account, such as preferred language and/or medical biographical information) for the user of the wearable device 105. The ability to store such information at the remote server 125 can be useful in reducing storage capacity needed at the wearable device 105 and, thereby, can help to increase the cost-effectiveness of the wearable device 105.

The wearable device 105 can include a wireless receiver 106, a first processor (e.g., programmable processor) and a first memory component 107, a graphical display 108, an input mechanism 120 (e.g., a microphone and/or one or more buttons), a speaker 121, a location tracking mechanism 122, and an access transmission component 123. Although not shown here, the wearable device 105 can also include a power supply component, such as a rechargeable battery or replaceable battery, to which the power consuming components of the wearable device 105 can be connected. In some embodiments, an exterior surface of the wearable device 105 can include an antimicrobial coating that is configured to provide a disinfectant capability at that exterior surface and/or the exterior surface of the wearable device 105 can include a fluid resistant coating that is configured to allow for application of a disinfectant fluid at the exterior surface of the wearable device 105 without materially degrading the graphical display 108 and/or other components of the wearable device 105. In one particular embodiment, the wearable device 105 can include a tactile feedback device connected to the first processor 106, and the first processor 106 can be configured to output a tactile triggering signal to the tactile feedback device causing the tactile feedback device to be actuated and output tactile feedback (e.g., vibration). The first processor 106 can output the tactile triggering signal to the tactile feedback device, and thus cause the tactile feedback device to output the tactile feedback, for instance, when data has been received at the wearable device 105 (e.g., when a message, such as a text message, has been received at the wearable device 105 from the remote user device 110).

The remote user device 110 can include a wireless transmitter 111, a second processor and a second memory component 112, and a user interface 113. The remote user device 110 can be, for example, a computing device, such as a personal computer, including a mobile computing device, such as a smart phone, laptop, or tablet.

The wireless receiver 106 of the wearable device 105 can be configured to be in direct or indirect wireless signal communication with the wireless transmitter 111 of the remote user device 110 via the wireless connection 115. For example, the wireless signal communication via the wireless connection 115 can be a Bluetooth, ZigBee, IEEE 802.11 ("WiFi"), cellular, or other type of wireless connection suitable for conveying data between the wearable device 105 and the remote user device 110. In the example where the wireless signal communication is a Bluetooth connection, one of the wearable device 105 and the remote user device 110 can output a pairing signal which is received at the other of the wearable device 105 and the remote user device 110 to establish a direct wireless connection between the wearable device 105 and the remote user device 110. The wireless connection 115 between the wearable device 105 and the remote user device 110 can facilitate transmission of data from the remote user device 110 to the wearable device 105. And, in some embodiments, the wireless connection 115 between the wearable device 105 and the remote user device 110 can further facilitate transmission of data from the wearable device 105 to the remote user device 110, in which case the wireless receiver 106 of the wearable device 105 can, for instance, be included as part of a transceiver at the wearable device 105, and the wireless transmitter 111 of the remote user device 110 can, for instance, be included as part of a transceiver at the remote user device 110.

In use, a user can provide a programming input at the user interface 113 of the remote user device 105. The programming input can include one or more graphics input at the user interface 113. For example, the one or more graphics input at the user interface 113 can include one or more alphanumeric characters and/or one or more images (e.g., emoji). As such, the user interface 113 can include one or more input mechanisms suitable for inputting alphanumeric characters and/or images. As one example, the user interface 113 can include a touchscreen and/or keypad associated with a display. The programming input can be a message or other visual representation that a user desires to display at the graphical display 108 of the wearable device 105.

The second memory component 112 stores non-transitory computer-executable instructions that, when executed by the second processor 112, cause the remote user device 110 to transmit a programming signal to the wearable device 105. For example, the non-transitory computer-executable instructions can be in the form of an application downloaded and stored at the second memory 112. This application can be configured to be executed by the second processor 112 to carry out the presentation of a graphical user interface at the user interface 113 to allow for the reception of the programming input at the remote user device 110 and the transmission of the programming signal to the wearable device 105. In another example, the non-transitory computer-executable instructions can be in the form of a web browser protocol downloaded and stored at the second memory 112, and the web browser protocol can be configured to be executed by the second processor 112 to carry out the reception of the programming input at the remote user device 110 and the transmission of the programming signal to the wearable device 105. The programming signal can correspond to the programming input received at the user interface 113 of the remote user device 110. The second processor 112 can cause the wireless transmitter 111 to send the programming signal to the wireless receiver 106 of the wearable device 105 over the wireless connection 115. In this way, the wireless receiver 106 of the wearable device 105 can receive a programming signal from the wireless transmitter 111 of the remote user device 110.

The first memory component 107 stores non-transitory computer-executable instructions that, when executed by the first processor 107, cause the wearable device 105 to display one or more graphics at the graphical display 108. Upon receiving the programming signal from the remote user device 110, the first processor 107 can execute the non-transitory computer-executable instructions to cause the first processor 107 to generate an interface input signal based on the received programming signal and convey the interface input signal to the graphical display 108 to cause the graphical display 108 to display one or more graphics corresponding to the interface input. As such, the one or more graphics displayed at the graphical display 108 can correspond to the programming signal received from the remote user device, and, thus, ultimately correspond to the programming input received at the user interface 113 of the remote user device 110.

As such, the user interface 113 at the remote user device 110 can be used to input one or more graphics for display at the graphical display 108 of the wearable device 105. This can allow the graphical display 108 at the wearable device 105 to be changed as desired quickly and conveniently via the remote user device 110.

As one example, in the case of a user who cannot verbally communicate (e.g., a mute), the user interface 113 at the remote user device 110 can be used to input desired graphics for the purpose of enabling such user to communicate via the graphical display 108 of the wearable device 105. Specifically, when such user wishes to communicate with another person, such user can input one or more alphanumeric characters and/or images (e.g., programming input) at the user interface 113 of the remote user device 110, and the non-transitory computer-executable instructions stored at the second memory component 112 can be executed by the second processor 112 to cause the remote user device 110 to transmit, via the wireless transmitter 111, a programming signal, corresponding to the programming input provided by the user at the user interface 113 of the remote user device 110, to the wearable device 105 over the wireless connection 115. In this way, a user who cannot verbally communicate can use the user interface 113 at the remote user device 110 to communicate with another person via the graphical display 108 at the wearable device 105.

As another example, in the case of a user who wishes to communicate with another person in a different language, the user interface 113 at the remote user device 110 can be used to input desired text in a first language for the purpose of communicating in a second, different language via the graphical display 108 of the wearable device 105. Specifically, when such user wishes to communicate with another person in a different language, such user can input one or more alphabetic text characters in a first language (e.g., first language programming input) at the user interface 113 of the remote user device 110. User input at the user interface 113 can also include input identifying the second, different language to which the user desires to have the input first language alphabetic text characters translated to. The non-transitory computer-executable instructions stored at the second memory component 112 (or at the first memory component 107) can include instructions for receiving the identified second, different language and translating alphabetic characters input in the first language to corresponding alphabetic characters in the identified second, different language. For instance, the non-transitory computer-executable instructions (e.g., at the second memory component 112 or at the first memory component 107) can include a correspondence table that correlates alphabetic characters (e.g., words) in a number of select languages to alphabetic text characters (e.g., words) in a number of other, different select languages. In another instance, the correspondence table can be stored remote from the remote user device 110 or the wearable device 105 (e.g., stored at the remote server 125, or "cloud"), and the non-transitory computer-executable instructions stored at the second memory component 112 can be executed by the second processor 112, or stored at the first memory component 107 and executed by the first processor 107, to communicate input first language alphabetic text characters (e.g., via the wireless transmitter 111) to the remote storage component (e.g., to the remote server 125, or "cloud") and retrieve corresponding second, different language alphabetic text characters. In various cases, the non-transitory computer-executable instructions stored at the second memory component 112 can be executed by the second processor 112 to cause the one or more first language alphabetic text characters input at the user interface 113 to be translated to corresponding one or more second, different language alphabetic text characters. Then, the remote user device 110 can transmit, via the wireless transmitter 111, a programming signal, to the wearable device 105 over the wireless connection 115, corresponding to the translated second, different language alphabetic text characters that are generated by executing the non-transitory computer-executable instructions at the remote user device 110. In this way, a user who wishes to communicate with another person in a different language can use the user interface 113 at the remote user device 110 to input a communication in a first language and communicate with another person using a second, different language via the graphical display 108 at the wearable device 105.

As noted, the wearable device 105 can include the input mechanism 120. As one example, the input mechanism 120 can include one or more buttons. For instance, the input mechanism 120 can include a privacy button that is configured to selectively enable/disable display of specific information at the wearable device 105. As such, the privacy button can be useful for allowing a wearer to selectively disable display of certain types of information in situations where the wearer's privacy is of greater concern than the need to share such certain types of information. As one specific such example, the privacy button can be configured, when actuated, to enable/disable display of medical biographical information, some or all wearer identification information, and/or some or all wearer contact information so as to enable selective privacy control for the wearer over the information displayed at the wearable device 105.

In some embodiments, the input mechanism 120 at the wearable device 105 can include a microphone. As one example, the wearable device 105 can include computer-executable instructions stored at the first memory component 107, and, when these computer-executable instructions are executed by the first processor 107, can cause the microphone to pickup ambient audio in the vicinity of the wearable device and store this ambient audio at the first memory 107 and/or process this ambient audio at the first processor 107 in accordance with the computer-executable instructions. For instance, the computer-executable instructions can be a voice recognition application executed by the first processor 107 to compare the ambient audio in the vicinity of the wearable device 105 to audio stored in a memory component (e.g., the first memory component 107, the second memory component 112, the third memory component 127) to determine whether the ambient audio in the vicinity of the wearable device 105 matches any audio record stored in the memory component to a predetermined degree. When it is determined that the ambient audio in the vicinity of the wearable device 105 matches an audio record stored in the memory component to the predetermined degree, the wearable device 105 can display an indication of the source (e.g., name of an individual, name of an animal, name of an appliance, etc.) of the ambient audio as the source tagged to the matched audio record stored in the memory component. This voice recognition capability at the wearable device 105 can be useful in providing the wearer with an indication of the source of audio, for instance where the wearer is hearing impaired.

The wearable device 105 can further include the location tracking mechanism 122. As one example, the location tracking mechanism 122 can include a global positioning system tracker (e.g., including a GPS transmitter and/or receiver) that is configured to identify a current location of the wearable device 105. The location tracking mechanism 122 can be connected to the first processor 107 to convey location wearable device location data to the first processor 107. For instance, the first processor 107 can be configured to output, via the graphical display 108, a current location of the wearable device 105 and/or the first processor 107 can be configured to cause the wearable device 105 (e.g., via the transmitter at the wearable device 105) to transmit the current location of the wearable device 105 to the remote user device 100 and/or to the remote server 125.

In one specific embodiment, the current location information of the wearable device 105 can be used to assist the privacy enablement/disablement function associated with the privacy button described previously. For instance, when the current location information of the wearable device 105 corresponds to a medical professional office, the first processor 107 can use this current location information to enable the display of medical biographical information, some or all wearer identification information, and/or some or all wearer contact information at the wearable device 105. And, likewise, when the current location information of the wearable device 105 corresponds to location outside the medical professional office, the first processor 107 can use this current location information to disable the display of medical biographical information, some or all wearer identification information, and/or some or all wearer contact information at the wearable device 105. As such, the first processor 107 can, when executing the corresponding stored computer-executable location tracking instructions, utilize the current location information of the wearable device 105 to automate the enablement/disablement of select information at the wearable device 105. To assist in this function, the wearer can input, to one of the storage components in the system 100, first predetermined information that is to be displayed at the wearable device 105 when the wearable device is at a first predetermined location and second, different predetermined information that is to be displayed at the wearable device 105 when the wearable device is at a second predetermined location.

And, the wearable device 105 can also include the access credential component 123, and the access credential component 123 can be connected to the first processor 107. The access credential component 123 can be configured to convey an access credential to an access restriction device (e.g., a door, gate, computing device, etc.) so to as selectively enable access to an area to which access is restricted by the access restriction device. For example, the access credential component 123 can include a unique access code that is output by a wireless transmitter (e.g., radio-frequency transmitter) or embedded at hardware of the access credential component 123 (e.g., embedded at a magnetic strip, bar code, QR code, etc.) and recognizable by the access restriction device to cause the access restriction device to be actuated and allow wearer access to the restricted area. As one such specific example, the access credential component 123 can be a radio-frequency identification ("RFID") chip or near-field communication ("NFC") chip that outputs the unique access code from the wearable device 105 for reception at the access restriction device.

Similar to that described previously, in one specific embodiment, the current location information of the wearable device 105, via the location tracking mechanism 122, can be used to assist the selective access function associated with the access credential component 123. For instance, when the current location information of the wearable device 105 corresponds to a location at or near an access restriction device, the first processor 107 can use this current location information to cause the access credential component 123 to output the unique access code from the wearable device 105 for reception at the access restriction device. And, likewise, when the current location information of the wearable device 105 corresponds to location remote from the access restriction device, the first processor 107 can use this current location information to cause the access credential component to terminate output of the unique access code from the wearable device 105. As such, the first processor 107 can, when executing the corresponding stored computer-executable access credential instructions, utilize the current location information of the wearable device 105 to automate the output, from the wearable device 105, of access credential information. This can help to facilitate more efficient power usage at the wearable device 105 which, in turn, can help to increase the cost-effectiveness of the wearable device 105.

Figure 2:
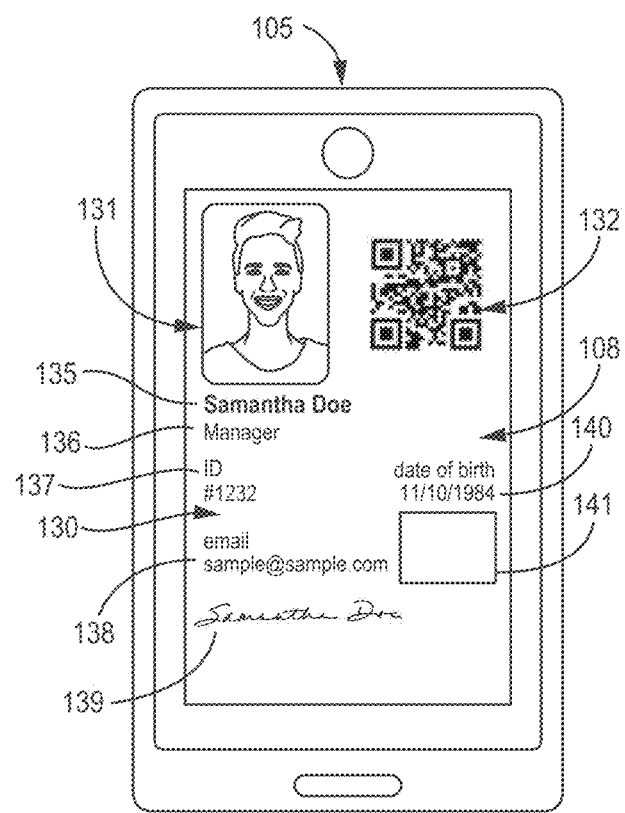
FIG. 2 is a plan view of the wearable device of FIG. 1 showing one embodiment of various exemplary types of information displayed at the graphical display of the wearable device.

FIG. 2 shows one exemplary embodiment of the wearable device 105. The embodiment of the wearable device 105 illustrated in FIG. 2 can be in the form of a wearable tag or badge. FIG. 2 shows a side of the wearable device 105 including an exemplary embodiment of the graphical display 108. As shown in the illustrated embodiment, the graphical display 108 can include a number of different display regions, including a first display region 130 configured to display text, a second display region 131 configured to display a photo, and a third display region 132 configured to display of one or more images. Each of these display regions at the wearable device 105 can display the one or more graphical elements (e.g., alphanumeric character, image, etc.) corresponding to programming input received at the user interface of the remote user device, and, therefore, each of these regions can be altered when desired by providing updated programming input at the user interface of the remote user device 110.

As noted, the first display region 130 can be configured to display text, such as in the form of alphanumeric characters. The first display region 130 can include two or more different text-based messages. At least some of the two or more different text-based messages can provide identification and/or contact information for the wearer. For example, as shown in the illustrated example, the first display region 130 can include two or more of a name 135 of the wearer, a job title 136 of the wearer, an identification number 137 assigned to the wearer, contact information (e.g., email address, phone number, social media handle, user name, etc.) 138 for the wearer, the wearer's signature 139, and the wearer's date of birth 140.

In some embodiments, the first display region 130 can further include a subjective text display field 141 that is configured to display any text-based message programmed at the wearable device 105. For example, the subjective text display field 141 can display any text-based message corresponding to programming input received at the user interface of the remote user device 110, and, therefore, the subjective text display field 141 can be altered when desired by providing desired programming input at the user interface of the remote user device 110. For instance, the wearable device 105 can receive one or more programming signals from the remote user device 110 providing instructions for a text-based message to be displayed at the subjective text display field 141. In some such cases, the one or more programming signals from the remote user device 110 providing instructions for a text-based message to be displayed at the subjective text display field 141 can include a time-based display parameter that provides instructions for a predetermined duration (e.g., 1 hour, 12 hours, 24 hours ("message of the day"), etc.) for which the message is to be displayed at the subjective display field 141. To facilitate implementation of the time-based display parameter that provides instructions for a predetermined duration, the wearable device 105 can include a clock component that can be configured to be set to the predetermined duration, corresponding to time-based display parameter received in the one or more programming signals from the remote user device 110, for the message displayed at the subjective display field 141.

In some examples, the subjective display field 141 can be programmed (e.g., via the remote user device 110) to display advertising information. As one example, the subjective display field 141 can be configured to display advertising information corresponding to advertising instructions received from the remote user device 110. In some such cases, the advertising instructions received from the remote user device 110 can include a location-based advertising instruction that specifies an advertising message to be displayed the subjective display field 141 when the wearable device 105 is at a specified location (e.g., as determined by the wearable device 105 using the location tracking mechanism 122). In this way, the wearable device 105 can be configured to implement the advertising instructions received from the remote user device 110 so as to change the advertising message displayed at subjective display field 141 when the location of the wearable device 105 changes. As one such specific example, when the location of the wearable device 105 changes, as determined by the wearable device 105 using the location tracking mechanism 122, so as to be outside of the specified location received via the advertising instructions received from the remote user device 110, the advertising message displayed at subjective display field 141 also changes.

In certain instances, where translation capability is included at the wearable device 105 and/or the remote user device 110, a text-based message can be input at the remote user device 110 in a first language and the subjective text display field 141 can display a corresponding text-based message in a second, different language. In other instances, the subjective text display field 141 can display a notification to contact a specified source such that the subjective text display field 141 can serve as a type of pager field to notify the wearer to contact the specified source (e.g., by displaying at the subjective text display field 141 a specific phone number, email address, etc.). In some instances, the subjective text display field 141 can display text-based messages that are more temporary in nature than the text-based messages providing identification and/or contact information for the wearer at other portions of the first display region 130. The subjective text display field 141 can display text-based messages, corresponding to the programming input received at the user interface of the remote user device 110, such as medical biographical information (e.g., wearer patient symptoms, wearer known allergies, such as any past allergic reactions to any pharmaceutical, wearer health insurance information, such as health insurance policy number, and/or wearer chronic conditions), wearer emotional mood and/or cognitive states, wearer's preferred language, wearer's political opinion(s), or other useful text-based messages pertaining to the wearer.

As noted, the second display region 131 can be configured to display a photo. As in the illustrated embodiment, the photo displayed at the second display region 131 can be a photo of the wearer. For example, the second display region 131 can display any photo corresponding to programming input received at the user interface of the remote user device 110, and, therefore, the photo displayed at the second display region 131 can be altered when desired by providing desired photo display programming input at the user interface of the remote user device 110. For instance, when a wearer is wearing the wearable device 105 while working in the capacity of the wearer's employment, the photo of the wearer displayed at the second display region 131 can be a photo of the wearer in attire or dress code relating to the wearer's employment, and, when the wearer is later wearing the wearable device 105 while outside of the capacity of the wearer's employment, the photo of the wearer displayed at the second display region 131 can be a photo of the wearer in attire or dress code different than that relating to the wearer's employment. As such, the photo displayed at the second display region 131 can be changed when desired, for instance, to correspond to the current capacity in which the wearer interacts with others.

As noted, the third display region 132 can be configured to display one or more images. As in the illustrated embodiment, the image displayed at the third display region 132 can be a quick-response ("QR") code. For instance, the quick-response code displayed at the third display region 132 can be a unique code corresponding to the specific wearer. In some such instances, the quick-response code can be configured to cause a device imaging the quick-response code to access information, stored remotely from the wearable device 105, pertaining to the wearer. As one such specific instance, the quick-response code can be configured to cause a device imaging the quick-response code to access remotely stored medical biographical information pertaining to the wearer (e.g., wearer patient symptoms, wearer known allergies, such as any past allergic reactions to any pharmaceutical, wearer health insurance information, such as health insurance policy number, and/or wearer chronic conditions). As such, the display of the quick-response code at the third display region 132 of the wearable device 105 can be useful in conveying information pertaining to the wearer even in instances where the wearer himself/herself is unable to communicate such information. In another example, the image displayed at the third display region 132 can be an emoji icon, for instance, that is selected by the wearer to convey a current emotional mood of the wearer.

A side of the wearable device 105 opposite the graphical display 108 can include an attachment mechanism. The attachment mechanism can be configured to removably attach the wearable device 105 to a user so that the wearable device 105 can be worn by the user. For example, the attachment mechanism can be a pin, magnet, or other suitable type of removable attachment at a wearer.

Figure 3:
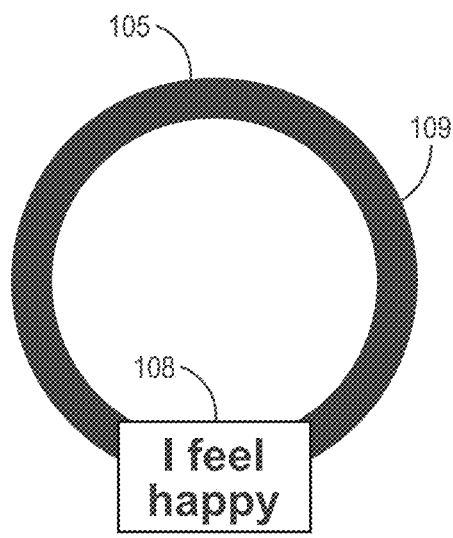
FIG. 3 is a perspective view of the wearable device of FIG. 1 in the form of a wearable belt or bracelet.

FIG. 3 shows another exemplary embodiment of the wearable device 105. The embodiment of the wearable device 105 illustrated in FIG. 3 is in the form of a belt or bracelet. As seen in FIG. 3, the belt or bracelet includes the graphical display 108. As described previously herein, the graphical display 108 can include one or more regions for display of text, photo, and/or image, such as that described elsewhere herein (e.g., in reference to FIG. 2). Such one or more regions of the graphical display 108 can display one or more graphical elements (e.g., alphanumeric character, photo, image, etc.) corresponding to programming input received at the user interface of the remote user device, and, therefore, each of these regions can be altered when desired by providing updated programming input at the user interface of the remote user device. As shown here, the graphical display 108 can be coupled to an attachment mechanism 109, in this example shown to be a belt or bracelet band. The attachment mechanism 109, here the belt or bracelet band, can be configured to attach the wearable device 105 to a user, such as around the user's waist or wrist, so that the wearable device 105 can be worn by the user when desired and removed.

Figure 4:
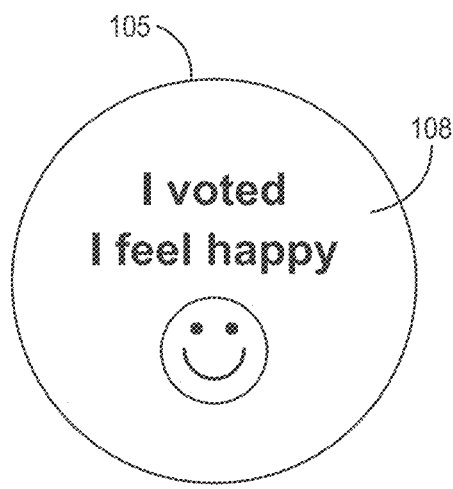
FIG. 4 is a plan view of the wearable device of FIG. 1 in the form of a wearable button.

FIG. 4 shows a further exemplary embodiment of the wearable device 105. The embodiment of the wearable device 105 illustrated in FIG. 4 is in the form of a button. FIG. 4 shows a side of the button including the graphical display 108. As described previously herein, the graphical display 108 can include one or more regions for display of text, photo, and/or image, such as that described elsewhere herein (e.g., in reference to FIG. 2). Each of these regions can display one or more graphical elements (e.g., alphanumeric character, image, etc.) corresponding to programming input received at the user interface of the remote user device, and, therefore, each of these regions can be altered when desired by providing updated programming input at the user interface of the remote user device. A side of the button opposite the graphical display 108 can include an attachment mechanism. For example, the attachment mechanism can be a pin, magnet, Velcro, adhesive, or other suitable type of removable attachment at a wearer. The attachment mechanism can be configured to removably attach the wearable device 105 to a user so that the wearable device 105 can be worn by the user and later removed.

Figure 5:
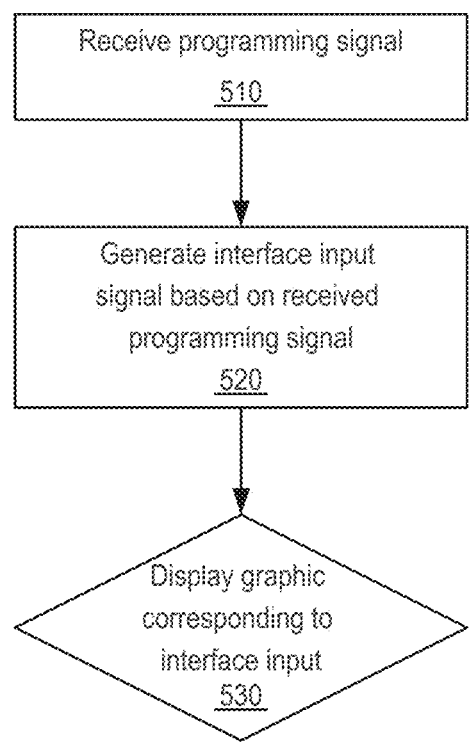
FIG. 5 is a flow diagram of an embodiment of a method of displaying a graphic at a wearable device.

FIG. 5 is a flow diagram of an embodiment of a method of displaying a graphic at a wearable device. The method embodiment shown in FIG. 5 can, for example, be carried out using any one or more of the wearable device, remote user device, and/or remote server embodiments disclosed elsewhere herein. For instance, the method embodiment shown in FIG. 5 can be carried out using any one or more of the components described in reference to the system 100 of FIG. 1 (e.g., any wearable device embodiment, any remote user device embodiment, and/or any remote server embodiment disclosed elsewhere herein).

At step 510, the method includes the step of receiving, at a wearable device, a programming signal. For example, the programming signal can be received, at the wearable device, from the remote user device (e.g., directly from the remote user device over a wireless connection, or indirectly, via a remote server, from the remote user device over a wireless connection). In particular, the programming signal can correspond to the programming input received at the user interface of the remote user device. Such input received at the user interface of the remote device can be in the form of a photo, image, and/or one or more alphanumeric text-based characters. The programming signal can be received at the wearable device via a wireless connection with the remote user device.

At step 520, the method includes the step of generating, at the wearable device, an interface input signal based on the received programming signal. For example, at step 520, upon receiving the programming signal from the remote user device, the wearable device can generate an interface input signal based on the received programming signal. The generated interface input signal can correspond to the received programming signal and be in a format usable by the wearable device to convey a command signal to the graphical display of the wearable device. This command signal can cause a specified region of the wearable device to display data corresponding to the received programming signal.

At step 530, the method includes the step of displaying one or more graphics, at the wearable device, corresponding to the interface input. As noted, at step 520, the wearable device can generate the interface input signal based on the received programming signal. This interface input signal can be conveyed to the graphical display of the wearable device and act to cause the graphical display to display one or more graphics corresponding to the interface input. As such, the one or more graphics displayed at the graphical display of the wearable device can correspond to the programming signal received from the remote user device, and, thus, ultimately correspond to the programming input received at the user interface of the remote user device.

In a further embodiment of the above method, the method can further include the step of receiving, at the wearable device, a second programming signal from the remote user device. The method can also include the step of generating, at the wearable device, a second interface input signal based on the received second programming signal. And, the method includes the step of altering the graphical display of the wearable device to display at least one second graphic at the graphical display. The at least one second graphic is different from the one or more graphics displayed at the graphical display corresponding to the first interface input signal and the first programming signal, and the at least one second graphic displayed at the graphical display of the wearable device corresponds to the second interface input signal and the second programming signal.

In this way, the method can allow a graphic displayed at a wearable device to be selected changed as desired. This is facilitated is a quick and convenient manner via input at the remote user device. And, as a result, this can allow a wearable device to be updated as circumstances change without needing to discard the wearable device and acquire a new wearable device. The method can provide a dynamically adjustable wearable device that can be easily repurposed for the circumstances in which it is to be used.

Various non-limiting exemplary embodiments have been described. It will be appreciated that suitable alternatives are possible without departing from the scope of the examples described herein.

What is claimed is:

1. A wearable electronic badge comprising:
   an exterior surface that includes an attachment mechanism, the attachment mechanism configured to removably attach the wearable electronic badge to a wearer of the wearable electronic badge;
   an antimicrobial coating at the exterior surface at least opposite the attachment mechanism;
   a processor;
   a wireless receiver connected to the processor, wherein the wireless receiver is configured to receive a programming signal from a remote user device, and wherein the programming signal includes a specified graphic that includes both a photo of the wearer of the wearable electronic badge and a text-based message;
   a privacy button connected to the processor;
   a microphone connected to the processor;
   a location tracking mechanism connected to the processor, the location tracking mechanism configured to identify a current location of the wearable electronic badge;
   a graphical display connected to the processor; and
   a memory component connected to the processor,
   wherein the memory component stores non-transitory computer-executable instructions that, when executed by the processor, cause the processor to display, at the graphical display, the photo of the wearer and the text-based message received via the programming signal from the remote user device as well as a quick-response code, the quick-response code being a unique code corresponding to the wearer of the wearable electronic badge,
   wherein the privacy button is configured to selectively enable and disable display of predetermined information from the memory component, related to the wearer, at the graphical display while maintaining display of the quick-response code at the graphical display,
   wherein the microphone is configured to detect ambient audio in the vicinity of the wearable electronic badge, wherein the non-transitory computer-executable instructions stored at the memory component include a voice recognition application that is configured, when executed by the processor, to cause the processor to compare the ambient audio in the vicinity of the wearable electronic badge to a plurality of audio records stored in the memory component to determine whether the ambient audio in the vicinity of the wearable electronic badge matches any one of the plurality of audio records stored in the memory component to a predetermined degree, wherein, when the processor determines that the ambient audio in the vicinity of the wearable electronic badge matches one of the plurality of audio records stored in the memory component to a predetermined degree, the processor is configured to cause the graphical display to display an indication of a source of the ambient audio in the vicinity of the wearable electronic badge, and
   wherein the processor uses the current location of the wearable electronic badge as input from the location tracking mechanism to output a command to the privacy button to selectively enable and disable display of the predetermined information from the memory component based on the current location of the wearable electronic badge.

2. The badge of claim 1, wherein the text-based message received via the programming signal from the remote user device includes a first text-based message and a second, different text-based message, and wherein the graphical display includes a first display region configured to display the first text-based message and the second, different text-based message, and wherein the graphical display includes a second display region configured to display the photo of a wearer of the wearable electronic badge.

3. The badge of claim 2, wherein the specified graphic includes a first specified text-based message to be displayed as the first text-based message at the first display region, a second specified text-based message to be displayed as the second, different text-based message at the first display region, and a first specified photo to be displayed as the photo of the wearer at the second display region.

4. The badge of claim 3, wherein the first text-based message and the second, different text-based message are selected from the group consisting of: a name of the wearer, a job title of the wearer, an identification number assigned to the wearer, contact information for the wearer, a signature of the wearer, and a date of birth of the wearer.

5. The badge of claim 2, wherein the graphical display further includes a third display region configured to display the quick-response code.

6. The badge of claim 5, wherein the quick-response code is configured to cause a device imaging the quick-response code to access information, stored remotely from the wearable electronic badge, pertaining to the wearer.

7. The badge of claim 6, wherein the quick-response code is configured to cause the device imaging the quick-response code to access medical biographical information pertaining to the wearer and stored remotely from the wearable electronic badge, and wherein the medical bibliographical information pertaining to the wearer is selected from the group consisting of: wearer medical symptoms, wearer allergies, wearer health insurance information, and wearer chronic condition(s).

8. The badge of claim 5, wherein the graphical display further includes a subjective text display field that is configured to display a message corresponding to the specified graphic, and wherein the message corresponding to the specified graphic and displayed at the subjective text display field includes an indication of at least one of an emotional mood of the wearer, a cognitive state of the wearer, and a preferred language of the wearer.

9. The badge of claim 2, wherein the non-transitory computer-executable instructions stored at the memory component are configured, when executed by the processor, to cause the processor to: (i) translate a message, received via the specified graphic, from a first language in which the specified graphic is received to a second, different language, and (ii) display, via the first display region, the message in the second, different language.

10. The badge of claim 9, wherein the memory component stores a correspondence table that correlates alphabetic characters of the first language to alphabetic characters of the second, different language.

11. The badge of claim 1, wherein the predetermined information includes medical biographical information.

12. The badge of claim 1, further comprising:
an access credential component connected to the processor, the access credential component configured to convey an access credential to an access restriction device to selectively enable access to an area to which access is restricted by the access restriction device.

13. The badge of claim 12, wherein the processor uses the current location of the wearable electronic badge as input from the location tracking mechanism to output a command to the access credential component to output the access credential based on the current location of the wearable electronic badge.

14. A system comprising:
a wearable electronic badge, the wearable electronic badge comprising:
an exterior surface that includes an attachment mechanism, the attachment mechanism configured to removably attach the wearable electronic badge to a wearer of the wearable electronic badge,
an antimicrobial coating at the exterior surface at least opposite the attachment mechanism,
a processor,
a wireless receiver connected to the processor,
a privacy button connected to the processor,
a microphone connected to the processor,
a location tracking mechanism connected to the processor, the location tracking mechanism configured to identify a current location of the wearable electronic badge,
a graphical display connected to the processor, and
a memory component connected to the processor,
wherein the memory component stores non-transitory computer-executable instructions that, when executed by the processor, cause the processor to display, at the graphical display, a specified graphic and a quick-response code, the quick-response code being a unique code corresponding to the wearer of the wearable electronic badge,
wherein the privacy button is configured to selectively enable and disable display of predetermined information from the memory component, related to the wearer, at the graphical display while maintaining display of the quick-response code at the graphical display;
a remote user device in wireless communication with the wearable electronic badge,
wherein the wireless receiver of the wearable electronic badge is configured to receive a programming signal from the remote user device, wherein the programming signal includes the specified graphic that includes both a photo of the wearer of the wearable electronic badge and a text-based message, and wherein the non-transitory computer-executable instructions, when executed by the processor, cause the processor to display, at the graphical display, the photo of the wearer and the text-based message received via the programming signal from the remote user device as well as the quick-response code
wherein the microphone is configured to detect ambient audio in the vicinity of the wearable electronic badge, wherein the non-transitory computer-executable instructions stored at the memory component include a voice recognition application that is configured, when executed by the processor, to cause the processor to compare the ambient audio in the vicinity of the wearable electronic badge to a plurality of audio records stored in the memory component to determine whether the ambient audio in the vicinity of the wearable electronic badge matches any one of the plurality of audio records stored in the memory component to a predetermined degree, wherein, when the processor determines that the ambient audio in the vicinity of the wearable electronic badge matches one of the plurality of audio records stored in the memory component to a predetermined degree, the processor is configured to cause the graphical display to display an indication of a source of the ambient audio in the vicinity of the wearable electronic badge,
wherein the processor uses the current location of the wearable electronic badge as input from the location tracking mechanism to output a command to the privacy button to selectively enable and disable display of the predetermined information from the memory component based on the current location of the wearable electronic badge; and
a remote server in wireless communication with the wearable electronic badge and the remote user device, the remote server configured to store account information of the wearer and transmit the account information of the wearer to the remote user device.

15. A method comprising the steps of:
- receiving, at a wearable electronic badge, a programming signal from a remote user device, wherein the wearable electronic badge includes an exterior surface that includes an attachment mechanism, the attachment mechanism configured to removably attach the wearable electronic badge to a wearer of the wearable electronic badge, wherein the wearable electronic badge device further includes an antimicrobial coating at the exterior surface at least opposite the attachment mechanism, a microphone, and a location tracking mechanism for identifying a current location of the wearable electronic badge, and wherein the programming signal includes a specified graphic for display at the wearable electronic badge, the specified graphic including both a photo of the wearer of the wearable electronic badge and a text-based message;
- as a result of receiving the programming signal, generating, at the wearable electronic badge, an interface input signal based on the received programming signal, the interface input signal providing the specified graphic from a memory component of the wearable badge device to a graphical display of the wearable electronic badge;
- displaying the specified graphic, including the photo of the wearer of the wearable electronic badge and the text-based message, at the graphical display of the wearable electronic badge and displaying a quick-response code at the graphical display of the wearable electronic badge, the quick-response code being a unique code corresponding to a wearer of the wearable electronic badge;
- after displaying the specified graphic at the graphical display of the wearable electronic badge, receiving, at the wearable electronic badge, a second programming signal from the remote user device, wherein the second programming signal includes a second specified graphic for display at the wearable electronic badge, the second specified graphic including a second text-based message that is different from the text-based message;
- as a result of receiving the second programming signal, generating, at the wearable electronic badge, a second interface input signal based on the received second programming signal, the second interface input signal providing the second specified graphic from the memory component of the wearable electronic badge to the graphical display of the wearable electronic badge;
- displaying the second specified graphic, including the second text-based message, at the graphical display of the wearable electronic badge;
- enabling/disabling display of predetermined information from the memory component, related to the wearer, at the graphical display of the wearable electronic badge while maintaining display of the quick-response code at the graphical display of the wearable electronic badge
- detecting, via the microphone, ambient audio in the vicinity of the wearable electronic badge;
- comparing the ambient audio in the vicinity of the wearable electronic badge to a plurality of stored audio records stored to determine whether the ambient audio in the vicinity of the wearable electronic badge matches any one of the plurality of stored audio records stored to a predetermined degree;
- upon determining that the ambient audio in the vicinity of the wearable electronic badge matches one of the plurality of stored audio records to a predetermined degree, displaying at cause the graphical display an indication of a source of the ambient audio in the vicinity of the wearable electronic badge; and
- using the current location of the wearable electronic badge from the location tracking mechanism to output, at the wearable electronic badge, a command to the privacy button to selectively enable and disable display of the predetermined information from the memory component.

* * * * *